United States Patent [19]

Bartholomew et al.

[11] 4,099,978

[45] Jul. 11, 1978

[54] HIGH REFRACTIVE INDEX HYDRATED GLASSES

[75] Inventors: Roger F. Bartholomew, Painted Post; Che-Kuang Wu, Horseheads, both of N.Y.

[73] Assignee: Corning Glass Works, Corning, N.Y.

[21] Appl. No.: 843,798

[22] Filed: Oct. 20, 1977

[51] Int. Cl.$^2$ .......................... C03C 3/10; C03C 3/30
[52] U.S. Cl. .................................... 106/53; 106/47 Q
[58] Field of Search ......................... 106/52, 53, 47 Q

[56] References Cited

U.S. PATENT DOCUMENTS

| | | | |
|---|---|---|---|
| 3,498,802 | 3/1970 | Bickford et al. | 106/52 |
| 3,498,803 | 3/1970 | Stookey | 106/52 |
| 3,811,853 | 5/1974 | Bartholomew et al. | 106/53 |
| 4,026,692 | 5/1977 | Bartholomew et al. | 106/53 |
| 4,046,545 | 9/1977 | Sanford et al. | 106/53 |

Primary Examiner—Winston A. Douglas
Assistant Examiner—Mark Bell

Attorney, Agent, or Firm—Clinton S. Janes, Jr.; Clarence R. Patty, Jr.

[57] ABSTRACT

The present invention is directed to the preparation of hydrated glasses in the $Na_2O$-$K_2O$-$PbO$-$SiO_2$ base composition system containing an amount of BaO and/or $Y_2O_3$ and/or ZnO and/or $ZrO_2$ effective to cause the hydrated glass to be essentially colorless. Such glasses are transparent, exhibit refractive indices higher than 1.60, and which demonstrate intrinsic thermoplastic properties thereby enabling such to be readily molded into optical quality components at relatively low temperatures. The operable glasses in the anhydrous state consist essentially, in mole percent on the oxide basis, of 8–18% $Na_2O$, 2–6% $K_2O$, 10–23% $Na_2O + K_2O$, >15 but <21% PbO, 55–67% $SiO_2$, the mole ratio PbO:$SiO_2$ being between 0.225–0.3, and an effective amount of BaO and/or $Y_2O_3$ and/or ZnO and/or $ZrO_2$ up to the indicated maxima of 5% BaO, 5% $Y_2O_3$, 8% ZnO, and 5% $ZrO_2$, BaO + $Y_2O_3$ + ZnO + $ZrO_2$ not exceeding 10%.

3 Claims, No Drawings

HIGH REFRACTIVE INDEX HYDRATED GLASSES

BACKGROUND OF THE INVENTION

The hydration of alkali metal silicate glasses is well known to the art. U.S. Pat. Nos. 3,498,802 and 3,498,803 provide fundamental discussions regarding the mechanism of the hydration reaction and indicate the wide range of glass compositions that can be sucessfully hydrated. Those patents also disclose the various property phenomena imparted to such glasses when water is incorporated into the structure thereof. Of especial interest is the low temperature thermoplasticity which the hydrated glasses can demonstrate.

Some hydrated glasses, however, exhibit such poor resistance to weathering and chemical attack that the surfaces thereof require immediate and continued protection from the ambient atmosphere lest the desirable thermoplastic behavior be lost. U.S. Pat. No. 3,811,853 takes advantage of that circumstance and describes the formation of products having compositions within defined limits of the alkali metal silicate system which will, under certain conditions, self-degrade in the ambient environment. Thus, self-degradation begins spontaneously after a weathering-resistant surface, previously applied to the articles, is purposely penetrated or removed, thereby exposing the interior of the articles to the ambient atmosphere.

An analysis of the above patents indicates that chemical durability and resistance to weathering (along with the degree of thermoplasticity exhibited by the hydrated body) are dependent upon the amount of water included in the glass structure. This appreciation led to research drawn to methods for controlling the amount of water which would be diffused into the glass during the hydration treatment.

One such process is disclosed in U.S. Pat. No. 3,912,481 which contemplates a two-step process. Thus, an alkali metal silicate glass is initially subjected to a saturated or near-saturated steam atmosphere at elevated temperatures, which step causes the essential saturation of the glass structure with water. Thereafter, the saturated glass is exposed to an environment of lower relative humidity such that the glass is dehydrated. This dehydration can be precisely controlled which permits the final water content of the glass to be carefully tailored.

A second such process is disclosed in U.S. Pat. No. 3,948,629 which involves a single-step, solution-hydration process. Thus, an alkali metal silicate glass is contacted with an aqueous acidic solution at elevated temperatures and pressures. Via regulation of the composition of the hydrating solution, the temperature, and the pressure, close control of the amount of water diffused into the glass structure is possible.

A third such process is disclosed in U.S. application Ser. No. 822,877, filed Aug. 8, 1977 in the names of Pierson and Tarcza. The method involves subjecting finely-dimensioned bodies of alkali silicate glass to a steam atmosphere of less than 50% relative humidity at very elevated temperatures. The low steam content of the hydrating environment leads to a relatively slow rate of water diffusion into the glass, thereby permitting excellent control of the amount of water taken up by the glass.

Each of those methods is operable within a broad range of starting glass compositions. Hence, on an anhydrous basis, operable glasses consist essentially, in mole percent on the oxide basis, of 3–25% $Na_2O$ and/or $K_2O$ and 50–95% $SiO_2$, the sum of those components constituting at least 55 mole percent of the total composition. Useful optional ingredients noted in those disclosures included up to 25% $Al_2O_3$, up to 20% BaO, up to 25% $B_2O_3$, up to 35% MgO, up to 25% ZnO, up to 20% PbO, and up to 25% CaO. Each of those disclosures also describes generally the capability of the hydrated materials to be compression molded at relatively low temperatures.

U.S. Pat. No. 4,046,545 describes a method for producing glass components of optical quality from hydrated glasses having compositions within a defined range. The method comprehends utilizing the general hydration process described in U.S. Pat. No. 3,912,481, supra. Thus, a glass having an anhydrous composition consisting essentially, in mole percent on the oxide basis, of 70–82% $SiO_2$, 10–17% $Na_2O$ and/or $K_2O$, and 5–15% ZnO and/or PbO is hydrated in a saturated or near-saturated steam atmosphere at elevated temperatures and pressures. Thereafter, the glass is dehydrated through exposure thereof to an atmosphere of lower relative humidity, an inert gas being conventionally introduced into the environment throughout the dehydration period to maintain the total pressure greater than the vapor pressure of the hydrated glass. Customarily, the partially dehydratd glass will have a water content of about 3–8% by weight. The partially dehydrated glass is then molded in a conventional manner, the use of tungsten carbide die surfaces being noted as yielding optical quality surfaces. The securing of optical quality hydrated glass in the bulk of the articles is achieved by means of the above-described deyhdration technique which assures homogeneous distribution of water throughout the glass bulk.

The availability of optical glasses with a wide range of refractive index is essential for many applications. For example, the curvature of the fast objective lens can be reduced when a glass of high refractive index is utilized for that purpose. It is well-recognized in the optical glass art that the addition of lead to a glass normally raises the refractive index thereof. However, the inclusion of additional PbO in the glasses of U.S. Pat. No. 4,046,545, supra, to raise the refractive indices thereof, i.e., to values over 1.60, customarily resulted in the glasses developing a yellow coloration after hydration.

OBJECTIVE OF THE INVENTION

The primary objective of the present invention is to provide hydrated glasses of an essentially colorless, transparent appearance and possessing thermoplastic behavior such as to be readily moldable at relatively low temperatures into optical quality components with refractive indices in excess of 1.60.

SUMMARY OF THE INVENTION

That objective can be achieved by hydrating a narrowly-defined range of compositions within the $Na_2O$-$K_2O$-PbO-$SiO_2$ base system in like manner to that described in U.S. Pat. No. 4,046,545, supra, but wherein an amount of BaO and/or $Y_2O_3$ and/or ZnO and/or $ZrO_2$ is included in the base composition effective to render the hydrated glass essentially free from extraneous coloration, i.e., to produce a substantially colorless glass. In the anhydrous state the glasses operable in the invention consist essentially, in mole percent on the oxide basis, of 8–18% $Na_2O$, 2–6% $K_2O$, 10–23% $Na_2O$ + $K_2O$, >15 but <21% PbO, 55–67% $SiO_2$, the mole ratio $PbO:SiO_2$ being >0.225 but <0.3, and an effective amount of BaO and/or $Y_2O_3$ and/or ZnO and/or $ZrO_2$ up to the indicated maxima of 5% BaO, 5% $Y_2O_3$, 8% ZnO, and 5% $ZrO_2$, the total BaO + $Y_2O_3$ + ZnO + $ZrO_2$ not exceeding 10%. Minor additions of such compatible metal oxides as $Al_2O_3$, $CeO_2$, $La_2O_3$, and $TiO_2$ can be included to improve the melting and forming capabilities of the anhydrous glass, to enhance the chemical durability of the glass, to stabilize the glass against devitrification, to increase the speed of hydration, and/or to affect other properties of the glass. Commonly, no more than about 3 mole percent of individual ingredients can be tolerated with a total of about 5 mole percent for all extraneous additions.

Maintaining the mole ratio $PbO:SiO_2$ between 0.225 and 0.3 is vital to the invention. Where the ratio is below 0.225, a refractive index greater than 1.60 will normally not be attained. And, although the presence of BaO and/or $Y_2O_3$ and/or ZnO and/or $ZrO_2$ acts to inhibit the development of extraneous coloration, customarily a yellow tint, glasses having $PbO:SiO_2$ mole ratios greater than 0.3 frequently take on a pronounced color hue even when one or more of those additive oxides is present.

In essence, then, the instant invention is drawn to a very narrow range of anhydrous glass compositions which can be successfully hydrated to produce transparent, colorless, hydrated glasses exhibiting refractive indices greater than 1.60. Because optical quality glass is desired as a final product, the method of hydration set forth in U.S. Pat. No. 4,046,545, supra, can be employed. The method for hydrating the operable glasses comprises no part of the instant invention so that any other means for hydrating glass to yield a product of optical quality is equally suitable. In general, a water content included in the final glass of about 3–8% by weight was deemed to be most satisfactory as imparting good thermoplasticity coupled with satisfactory chemical durability.

DESCRIPTION OF PREFERRED EMBODIMENTS

The following table recites several approximate anhydrous glass compositions, expressed in terms of mole percent on the oxide basis, outlining the compositional parameters of the invention. Operable batch ingredients therefor can comprise any materials, either the oxides or other compounds, which, when melted in combination, will be converted into the desired oxides in the proper proportions. The batch constituents are compounded, mixed together thoroughly, commonly in a ball mill, to assist in obtaining a homogeneous melt, and then melted at temperatures in the vicinity of 1400°–1500° C. Melts prepared in the laboratory use platinum or silica crucibles but, of course, larger melts can be made in pots or continuous melting units in accordance with conventional commercial glassmaking practice. The laboratory crucible melts are shaped into bodies of desired geometries employing glass forming practices well known to the art and those bodies annealed. Commonly, the laboratory melts are simply poured onto steel plates to form patties which are then immediately transferred to an annealer operating at about 450°–500° C. To secure the refractive index data reported in the table, plates approximately 4½ inches × 1 inch × 2 mm, were cut from the annealed patties and subsequently ground and polished.

The polished plates were hydrated in an autoclave having a volume of about 1 cubic foot, being end supported on refractory board above a pool of water in the bottom of the autoclave, the water being present in sufficient quantity to insure a saturated steam atmosphere when the autoclave is in operation. Autoclave temperatures in excess of 200° C. and, preferably, between about 250°–350° C., will be employed. While useful for hydrating the glass, temperatures above 350° C. hazard physical deformation of the plates. Thereafter, the glass will be partially dehydrated in the autoclave via an atmosphere of reduced relative humidity, but in the presence of an over pressure of inert gas, to produce a total pressure in the autoclave greater than the vapor pressure of the water within the glass.

TABLE

| | 1 | 2 | 3 | 4 | 5 | 6 | 7 | 8 | 9 | 10 |
|---|---|---|---|---|---|---|---|---|---|---|
| $SiO_2$ | 64.5 | 56.2 | 57.3 | 59.46 | 56.56 | 62.76 | 59.97 | 65.79 | 62.2 | 62.0 |
| PbO | 16.2 | 15.1 | 16.2 | 16.6 | 16.6 | 18.54 | 22.15 | 14.58 | 16.8 | 16.7 |
| $Na_2O$ | 11.4 | 17.5 | 15.4 | 11.9 | 14.8 | 8.82 | 8.43 | 9.25 | 13.4 | 11.7 |
| $K_2O$ | 4.8 | 4.1 | 4.3 | 3.9 | 3.9 | 2.50 | 2.39 | 2.63 | 4.7 | 4.9 |
| $Al_2O_3$ | 1.7 | 1.8 | 1.8 | 1.8 | 1.8 | 1.04 | 1.00 | 1.10 | 1.8 | 1.8 |
| ZnO | 1.4 | 5.3 | 5.0 | 5.6 | 5.6 | 6.34 | 6.06 | 6.65 | — | — |
| $ZrO_2$ | — | — | — | 0.74 | 0.74 | — | — | — | — | 1.5 |
| $Y_2O_3$ | — | — | — | — | — | — | — | — | 0.8 | — |
| BaO | — | — | — | — | — | — | — | — | — | 1.2 |
| $PbO:SiO_2$ | 0.251 | 0.270 | 0.283 | 0.278 | 0.293 | 0.295 | 0.369 | 0.221 | 0.270 | 0.269 |
| $n_D$ | 1.604 | 1.632 | 1.622 | 1.642 | | | | 1.594 | 1.618 | 1.627 |

As can be observed from the table, glass composition is critical to the inventive glasses. Thus, composition 7, having a $PbO:SiO_2$ ratio greater than 0.3, displayed a pronounced yellow coloration, whereas composition 8, having a $PbO:SiO_2$ ratio less than 0.225, had a measured refractive index of less than 1.60.

To specifically illustrate the inventive practice, the following example is provided.

EXAMPLE

A batch for composition 1 of the above table was compounded, the batch melted in a platinum crucible for two hours at 1400° C., the melt poured onto a steel plate to form patties, and the patties immediately transferred to an annealer operating at 480° C. Plates 2 mm thick were ground and polished from the annealed patties. 4.5 × 1 inch sections were cut from the plates, supported on TRANSITE ® board or TEFLON ® sheet, and placed in an autoclave having an interval volume of 1 ft³. Three liters of distilled water were placed in the bottom of the autoclave. The autoclave was heated to 270° C. and held at that temperature for 48 hours, the saturated steam atmosphere therein exhibiting a pressure of 820 psig. The autoclave was cooled, a sample removed therefrom, and a water content of 9.96% by weight was determined via loss on ignition. The water content of the autoclave was set at 250 ml. and nitrogen gas at 30° C. introduced into the chamber to yield a $N_2$ pressure of 490 psig. The temperature of the autoclave was raised to 270° C. and maintained thereat for 4 days, the total pressure of $N_2 + H_2O$ vapor being 1060 psig. Upon removal from the autoclave, the dehydrated glass exhibited a water content of 5.6% by weight, as measured via loss on ignition, with an index of refraction of 1.604.

A second sample of the dehydrated (5.6% $H_2O$-containing) glass had several 0.5 inch diameter discs core drilled from the plate and the flat surfaces thereof polished. The discs were then stacked between two polished dies of tungsten carbide, the dies having the necessary geometry of plano ophthalmic lenses. The mold assembly was then heated to 300° C., pressure being slowly applied to the dies above 180° C. until 8000 psi was attained. Thereafter, the assembly was cooled to 130° C., the pressure released, and an integral glass body removed. Examination of the shaped body indicated surfaces faithfully reproducing the die faces. No signs of lead reduction were observed where the glass had been in contact with the mold surface.

A third sample of the dehydrated glass was subjected to the American Optical Durability Test. That test is essentially a standard in the optical and ophthalmic glass art and involves immersing a previously weighed and accurately measured plate or disc into an aqueous 10% by weight HCl solution at a temperature of 25° C. for 10 minutes. A weight loss of less than 0.5 mg/cm$^2$ with no change in surface appearance constitutes successful compliance with the test. A weight loss of only 0.03 mg/cm$^2$ by the sample indicates ready passage of the test.

A study of these three examples is believed to illustrate that molded optical quality articles having a colorless, transparent appearance with an index of refraction in excess of 1.60 can be readily obtained through the hydration of glasses having compositions within the inventive range.

We claim:

1. A hydrated glass of optical quality with an essentially colorless, transparent appearance and a refractive index in excess of 1.60 consisting essentially, on the anhydrous basis in mole percent on an oxide basis, of 8–18% $Na_2O$, 2–6% $K_2O$, 10–23% $Na_2O + K_2O$, >15 but <21% PbO, 55–67% $SiO_2$, the mole ratio PbO:$SiO_2$ being >0.225 but <0.3, and an amount of BaO and/or $Y_2O_3$ and/or ZnO and/or $ZrO_2$ effective to render the hydrated glass essentially colorless up to the indicated maxima of 5% BaO, 5% $Y_2O_3$, 8% ZnO, and 5% $ZrO_2$, the total BaO + $Y_2O_3$ + ZnO + $ZrO_2$ not exceeding 10%.

2. A hydrated glass according to claim 1 wherein the water content therein ranges between about 3–8% by weight.

3. A hydrated glass according to claim 1 wherein said glass, on the anhydrous basis, also contains up to 3% individually of $Al_2O_3$, $CeO_2$, $La_2O_3$, and $TiO_2$, the total of such additions not exceeding about 5%.

* * * * *